United States Patent
Singh et al.

(10) Patent No.: US 10,311,251 B2
(45) Date of Patent: Jun. 4, 2019

(54) SYSTEM AND METHOD FOR MASKING AND COMMUNICATING MODIFIED MULTIMEDIA CONTENT

(71) Applicants: Adheraj Singh, New Delhi (IN); Harleen Deol, Mohali (IN)

(72) Inventors: Adheraj Singh, New Delhi (IN); Harleen Deol, Mohali (IN)

(73) Assignees: Adheraj Singh, New Delhi (IN); Harleen Deol, Mohali (IN)

( * ) Notice: Subject to any disclaimer, the term of this patent is extended or adjusted under 35 U.S.C. 154(b) by 296 days.

(21) Appl. No.: 15/086,022

(22) Filed: Mar. 30, 2016

(65) Prior Publication Data

US 2016/0321470 A1    Nov. 3, 2016

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/62* | (2013.01) | |
| *G06F 21/32* | (2013.01) | |
| *H04L 29/06* | (2006.01) | |

(52) U.S. Cl.
CPC .......... *G06F 21/6263* (2013.01); *G06F 21/32* (2013.01); *H04L 65/602* (2013.01)

(58) Field of Classification Search
CPC .............. G06F 21/6263; G06F 3/0481; G06F 21/6245; G06F 3/04842; G06F 2221/032; G06F 21/60; H04L 65/602; H04L 65/601
See application file for complete search history.

(56) References Cited

U.S. PATENT DOCUMENTS

| | | | | |
|---|---|---|---|---|
| 2007/0153091 A1* | 7/2007 | Watlington | .............. | H04N 7/15 348/208.14 |
| 2014/0201844 A1* | 7/2014 | Buck | ...................... | G06F 21/50 726/26 |
| 2015/0281158 A1* | 10/2015 | Grinspan | ................ | H04L 51/18 715/753 |

* cited by examiner

*Primary Examiner* — Trong H Nguyen
*Assistant Examiner* — Amie C. Lin
(74) *Attorney, Agent, or Firm* — Barry Choobin; Patent 360 LLC

(57) ABSTRACT

The embodiments herein provide a method and system for masking personally identifiable elements in a captured multimedia content and communicating through an integrated messaging system. The method comprises capturing multimedia content, automatically or manually identifying and selecting content or coordinates of the personally identifiable elements for modification manually, automatically or semi-automatically, modifying the identified elements through a disfiguring or masking process selected from a group consisting of blurring, pixelating, pixel manipulation, modulating, deleting, hiding, applying several layers to an image or frame, superimposing an image or character, audio processing, and altering multimedia information, and displaying the modified multimedia on the second computing device. The modification is done internally at sender end, or externally at a central server or at a receiver end device. The multimedia content is modified and stored for sharing with another user at a later time. One or more elements of the multimedia content are modified.

16 Claims, 8 Drawing Sheets

SYSTEM AND METHOD FOR MASKING AND COMMUNICATING MODIFIED MULTIMEDIA CONTENT

CROSS-REFERENCE TO RELATED APPLICATION

Benefit is claimed under 35 U.S.C. 19(a)-(d) to Foreign application Serial No. 885/DEL/2015 filed in India entitled "A SYSTEM AND METHOD FOR COMMUNICATING MODIFIED MULTIMEDIA CONTENT", on Mar. 30, 2105, which is herein incorporated in its entirety by reference for all purposes.

BACKGROUND

Technical Field

The embodiments herein are generally related to a transmission of digital information. The embodiments herein are particularly related to a transmission of multimedia information. The embodiments herein are more particularly related to the transmission of multimedia information using a computing device such that the multimedia information is altered to hide any personally identifiable content such as faces, body parts, voice, audio and the like.

Description of the Related Art

A messaging service enables a plurality of users to transmit and receive the messages from each other. The messaging service provides one or more features including one-to-one chatting feature, one-to-many chatting feature, many-to-many chatting feature, a file transmitting and receiving feature, multimedia transmitting and receiving feature, live video conference feature, etc., between two or more users and the like.

Currently, the messaging services are not monopolized by a single service provider but competitively provided by a plurality of service providers. For example, MSN messenger by Microsoft®, WhatsApp® messenger, Hike® messenger, Skype™, Snapchat™ messenger and the like. However, one of the disadvantages of the existing messaging services is that none of these messaging services allow the users to maintain privacy by masking personally identifiable elements such as faces, body parts, voice, location data, audio and the like in multimedia within the messenger application. The masking process includes methods such as blurring, pixelating, modulating, deleting, hiding, manipulating individual pixel or a group of pixels, applying one or more layers to an image or frame, superimposing an image or character, audio processing, one or more other alterations on multimedia information, etc.

Further, the currently available messengers do not allow the users to automatically or semi-automatically identify and mask the personally identifiable elements in a multimedia content within the messenger application.

Further, the currently available messengers do not allow a masking of the personally identifiable elements (that are identified automatically or manually) in a multimedia in real-time or in near real-time. Such real-time masking is sometimes required in the applications such as video conferencing between a plurality of users.

Hence, there is a need for a method and system for providing a messenger application that allows the user to communicate electronically while maintaining anonymity and privacy by masking the personally identifiable elements in a multimedia content that is exchanged. Further, there is a need for a method and system for masking the personally identifiable elements in the multimedia contents automatically or semi-automatically. Furthermore, there is a need for a method and system for masking the personally identifiable elements in a multimedia content in real-time (such as in a video conference session) or in near real-time. Still further there is a need for a system and method for masking the personally identifiable elements in a multimedia content internally or externally. Yet further there is a need for a system and method for masking the personally identifiable elements in a multimedia content on a communication device such as mobile device, tablet, etc. Yet further there is a need for a system and method for masking the personally identifiable elements in a multimedia content on a communication device based on an operating system in the communication device. Yet further there is a need for a system and method for masking the personally identifiable elements in a multimedia content at a transmission end or at central location/server or at a receiving end.

The above-mentioned shortcomings, disadvantages and problems are addressed herein and which will be understood by reading and studying the following specification.

OBJECTS OF THE EMBODIMENTS HEREIN

The primary object of the embodiments herein is to develop a messaging application that allows users to communicate electronically and share multimedia content while maintaining privacy and anonymity by masking personally identifiable elements such as such as faces, body parts, voice, location data, audio and the like in multimedia content.

Another object of the embodiments herein is to develop a messaging application that automatically detects personally identifiable elements in the multimedia content and masks the personally identified information present in the detected elements to maintain privacy and anonymity.

Yet another object of the embodiments herein is to develop a messaging application that provides an option to the user to manually define the coordinates of the elements in the multimedia content for masking the personally identifiable information present in the elements.

Yet another object of the embodiments herein is to develop a messaging application that semi-automatically detects personally identifiable elements in the multimedia content to mask the identified elements in the multimedia content to maintain privacy and anonymity.

Yet another object of the embodiments herein is to provide a messaging application that identifies and masks personally identifiable elements automatically, manually or semi-automatically in real-time or in near real-time.

Yet another object of the embodiments herein is to develop a system, method and an application that provides a plurality of options for masking such as blurring, pixelating, manipulating individual pixels, modulating, deleting, hiding, applying one or more layers to an image or frame, superimposing an image or character, audio processing, one or more alterations in multimedia information.

Yet another object of the embodiments herein is to develop a system, method and an application that provides a plurality of options for modifying or varying the intensity of the masking such as intensity of blurring, pixel size during pixilating, etc., to the user to mask the identified elements in the multimedia content.

Yet another object of the embodiments herein is to develop a messaging application that allows two or more users to have a video conference in which the one or more personally identifiable elements such as faces, body parts, voice, location data, audio, background image, etc., in a multimedia content, are identified and masked automatically or semi-automatically or manually at a transmission end device, or at a receiving end device or at a central server.

Yet another object of the embodiments herein is to develop a messaging application that allows two or more users to share pictures in which one or more personally identifiable elements such as faces, body parts, location data, etc., of one or more users are identified automatically or semi-automatically and are masked.

Yet another object of the embodiments herein is to share the masked multimedia content using one or more communication platforms.

Yet another object of the embodiments herein is to develop a messaging application to specify a boundary area to be masked manually or automatically or semi-automatically.

Yet another object of the embodiments herein is to develop a messaging application to specify a boundary area to be masked by touching an image on a touch screen display.

Yet another object of the embodiments herein is to develop a messaging application to specify area/areas to be masked by outlining or marking or specifying areas on a displayed image using a finger or fingers.

Yet another object of the embodiments herein is to develop a messaging application to mask specific areas of multimedia contents in a computing device in advance and to transmit the already masked and stored multimedia content to the user during a communication process.

Yet another object of the embodiments herein is to develop a system and method for capturing and editing pictures, saving edited pictures on user communication device and transmitting edited pictures using a messaging application.

Yet another object of the embodiments herein is to develop a messaging application that allows users to maintain privacy and anonymity during an interpersonal communication between two or more individuals by masking personally identifiable elements such as such as faces, body parts, voice, location data, audio and the like in multimedia content.

Yet another object of the embodiments herein is to develop a messaging application that allows users to maintain privacy and anonymity of a source by masking personally identifiable elements such as such as faces, body parts, voice, location data, audio and the like in multimedia content.

Yet another object of the embodiments herein is to develop a system, method and an application for masking an audio feed and a video feed simultaneously at an instance.

Yet another object of the embodiments herein is to develop a system, method and an application for masking an audio feed to prevent recognition of voice by modifying a frequency, speed, and modulation of the audio feed.

Yet another object of the embodiments herein is to develop a system, method and an application for masking a specified area in the captured multimedia contents by specifying the area/areas to be masked in a video feed or still picture by specifying areas with one or more fingers on a picture or video displayed on a screen.

Yet another object of the embodiments herein is to develop a system, method and an application for masking a specified area in the captured multimedia contents by specifying the area/areas to be unmasked/unblurred in a video feed or still picture by specifying areas with one or more fingers on a picture or video displayed on a screen.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the most detailed description that is presented later. The objects and advantages of the embodiments herein will become readily apparent from the following description taken in conjunction with the accompanying drawings.

According to an embodiment herein, a system is provided for modifying a multimedia content and transmitting the modified multimedia content between two computing devices or communication devices comprising a hardware processor and a memory through a messenger application. The system comprises a multimedia capture module, an identification module coupled to the multimedia capture module, a modification module coupled to the identification module, a first messaging application program interface (API) module coupled to the modification module, a second messaging application program interface (API) module, and a display module.

According to an embodiment herein, the multimedia capture module is arranged in a first computing device to capture the multimedia content. The multimedia content includes an image, a picture, a video, metadata, Global Positioning System (GPS) coordinates and an audio.

According to an embodiment herein, the identification module is configured to select one or more personally identifiable elements in the captured multimedia content for modification. The one or more personally identifiable elements are selected from a group consisting of a face of a user, body parts of a user, a location data, an audio data, a video data, a background image data, a foreground image data and a surrounding environment. The identification module is configured to select the one or more personally identifiable elements of the captured multimedia content in real-time or near real-time.

According to an embodiment herein, the modification module is coupled to the identification module to modify the captured multimedia content. The modification module is configured to modify the selected one or more personally identifiable elements in the captured multimedia content. The modification module is configured to modify the selected one or more personally identifiable elements in the captured multimedia content through an image disfiguring, pixel manipulation or masking process. The modification module is configured to modify the selected one or more personally identifiable elements of the captured multimedia content in real-time or near real-time.

According to an embodiment herein, the first messaging application program interface (API) module is coupled to the modification module. The first messaging API module is provided in the first computing device. The first messaging API module is configured to acquire the modified multimedia content from the modification module and transmit the modified multimedia content to a second computing device. The first messaging API module is configured to provide a cross-platform compatibility.

According to an embodiment herein, the second messaging application program interface (API) module is configured to receive the modified multimedia content from the first computing device. The second messaging API module is provided in the second computing device.

According to an embodiment herein, the display module is configured to exhibit the modified multimedia content. The display module is coupled to the second messaging application program interface (API) module. The display module is present in the second computing device. The display module is configured to receive the modified multimedia content from the second messaging application program interface (API) module for displaying the modified multimedia content in the second computing device.

According to an embodiment herein, the modification module is provided internally with the first computing device or on an external server or in a second computing device at a receiver end to modify the captured multimedia content.

According to an embodiment herein, the modification module is configured to modify the selected one or more personally identifiable elements in the captured multimedia through the image disfiguring or masking process selected from a group consisting of masking, blurring, pixilating, manipulating individual pixel or a group of pixels, modulating, deleting, hiding, applying one or more layers and filters, superimposing an image or character, audio processing, selective revealing, voice modulation processes, and altering the multimedia content visually.

According to an embodiment herein, the modification module is configured to vary an intensity of masking by varying an intensity of blurring, varying a pixel size during pixelating in the captured multimedia content.

According to an embodiment herein, the modification module is configured to alter an audio feed to prevent a recognition of a voice of a speaker. The modification module is configured to alter the audio feed by modifying a frequency, a speed and a modulation of the audio feed. The modification module is configured to modify both the audio feed and a video feed at an instance successively or simultaneously.

According to an embodiment herein, the identification module is configured to select the one or more personally identifiable elements in the captured multimedia content for modification manually or automatically or semi-automatically. The identification module is configured to select the one or more personally identifiable elements in the captured multimedia content manually by outlining a preset area/areas in the video feed or still picture image by using one or more fingers to specify area/areas to be masked or blurred. The identification module is configured to select the one or more personally identifiable elements in the captured multimedia content manually by outlining a preset area/areas in the video feed or still picture image by using one or more fingers to specify area/areas to be unmasked or unblurred.

According to an embodiment herein, the identification module is configured to select the one or more personally identifiable elements in the captured multimedia content for modification automatically by using an application program interface. The application program interface is selected from a group consisting of a CI detector class, open CV function and Face Detector class.

According to an embodiment herein, the system further comprises a hardware processor for controlling the modification module based on user inputs to modify the selected one or more personally identifiable elements in the captured multimedia content.

According to an embodiment herein, the system further comprises a memory for storing the modified multimedia content for sharing with another user at a later time.

According to an embodiment herein, the first messaging application program interface (API) module is configured to transmit the modified multimedia content received from the modification module or the modified multimedia which is stored already in the memory.

According to an embodiment herein, the modified multimedia content is transmitted from the first computing device to the second computing device through a communication network.

According to an embodiment herein, the first computing device and the second computing device are selected from a group consisting of a mobile phone, a smartphone, a laptop, a general purpose computer, a personal assistant device (PDA), a wearable device, a communication device and a gaming device.

According to an embodiment herein, the modified multimedia content is stored either in the first computing device or in the second computing device or both in the first computing device or in the second computing device.

According to an embodiment herein, a computer-implemented method comprising instructions stored on a non-transitory computer-readable storage medium and executed on a computing device provided with a hardware processor and a memory for modifying and transmitting a multimedia content between two computing devices or communication devices through a messenger application is provided. The method comprising the steps of capturing a multimedia content from a first computing device through a multimedia capture module. The multimedia content includes an image, a picture, a video, metadata, Global Positioning System (GPS) coordinates and an audio. One or more personally identifiable elements in the captured multimedia content are identified and selected by an identification module for modification. The one or more personally identifiable elements are selected from a group consisting of a face of a user, body parts of a user, a location data, an audio data, a video data, a background image data, a foreground image data and a surrounding environment. The one or more personally identifiable elements of the captured multimedia content are selected in real-time or near real-time. The one or more personally identifiable elements in the captured multimedia content are selected for modification manually or automatically or semi-automatically. The one or more personally identifiable elements are identified automatically through an identification technique. The identification technique is selected from a group consisting of a face recognition techniques, an image recognition technique, a pattern recognition technique, an audio and video recognition technique, and a natural language processing technique.

According to an embodiment herein, the captured multimedia content is modified through a modification module. The captured multimedia content is modified by modifying the selected one or more personally identifiable elements in the captured multimedia content. The selected one or more personally identifiable elements in the captured multimedia content is modified through an image disfiguring or masking process. The image disfiguring or masking process is selected from a group consisting of a masking, blurring, pixilating, modification of a pixel or group of pixels, modulating, deleting, hiding, applying one or more layers and filters, superimposing an image or character, audio processing, selective revealing, voice modulation processes, and altering the multimedia content visually. The selected one or more personally identifiable elements of the captured multimedia content are modified in real-time or near real-time.

According to an embodiment herein, the modified multimedia content is communicated to a second computing device through the application program interface (API) module of the messaging application. The API module is configured to provide a cross-platform compatibility.

According to an embodiment herein, the modified multimedia content is displayed on the second computing device through the display module.

According to an embodiment herein, the captured multimedia content is modified internally in the first computing device or on an external server or in a second computing device at a receiver end.

According to an embodiment herein, the modified multimedia content is transmitted from the first computing device to the second computing device through a communication network. The modified multimedia content is stored in the first computing device and the second computing device. The modified multimedia content is stored in a memory for sharing with another user at a later time. The modified multimedia content is transmitted from the first computing device to the second computing device through a communication network.

According to an embodiment herein, the first computing device and the second computing device are selected from a group consisting of a mobile phone, a smartphone, a laptop, a general purpose computer, a personal assistant device (PDA), a wearable device, a communication device and a gaming device.

According to an embodiment herein, the captured multimedia content is modified to vary an intensity of masking by varying an intensity of blurring, varying a pixel size during pixelating in the captured multimedia content.

According to an embodiment herein, the captured multimedia content is modified by altering an audio feed to prevent a recognition of a voice of a speaker. The audio feed is altered by modifying a frequency, a speed and a modulation of the audio feed. The captured multimedia content is modified by altering both the audio feed and a video feed at an instance successively or simultaneously.

According to an embodiment herein, the one or more personally identifiable elements in the captured multimedia content are selected manually by outlining a preset area/ areas in the video feed or still picture image by using one or more fingers to specify area/areas to be masked or blurred. The one or more personally identifiable elements in the captured multimedia content are selected manually by outlining a preset area/areas in the video feed or still picture image by using one or more fingers to specify area/areas to be unmasked or unblurred.

According to an embodiment herein, the one or more personally identifiable elements in the captured multimedia content are selected for modification automatically by using an application program interface. The application program interface is selected from a group consisting of a CI detector class, open CV, and Face Detector class.

According to an embodiment herein, the method further comprises controlling the modification process with a hardware processor based on user inputs for modifying the selected one or more personally identifiable elements in the captured multimedia content.

According to an embodiment herein, the captured multimedia content is modified already using a software application on the first computing device in advance for transmitting at a later time.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
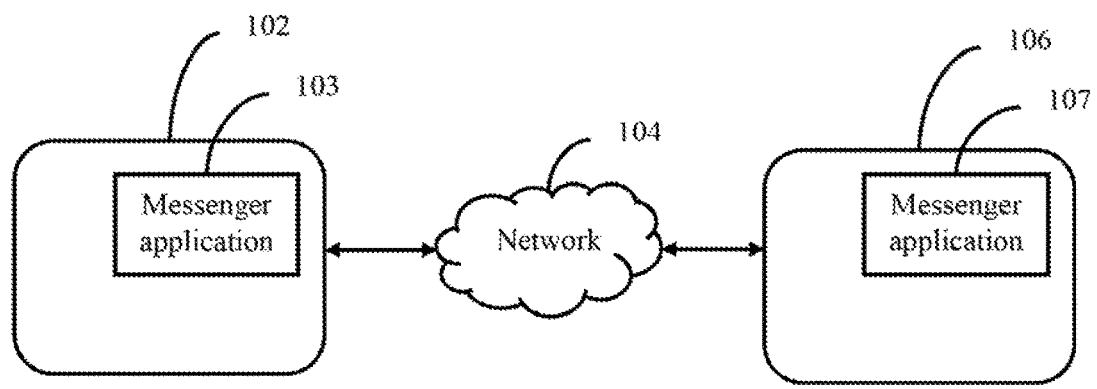
FIG. 1 illustrates a block diagram of a system for modifying and transmitting multimedia contents between two communication devices in a communication network, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

According to an embodiment herein, a system is provided for modifying a multimedia content and transmitting the modified multimedia content between two computing devices or communication devices comprising a hardware processor and a memory through a messenger application. The system comprises a multimedia capture module, an identification module coupled to the multimedia capture module, a modification module coupled to the identification module, a first messaging application program interface (API) module coupled to the modification module, a second messaging application program interface (API) module, and a display module.

According to an embodiment herein, the multimedia capture module is arranged in a first computing device to capture the multimedia content. The multimedia content includes an image, a picture, a video, metadata, Global Positioning System (GPS) coordinates and an audio.

According to an embodiment herein, the identification module is configured to select one or more personally identifiable elements in the captured multimedia content for modification. The one or more personally identifiable elements are selected from a group consisting of a face of a user, body parts of a user, a location data, an audio data, a video data, a background image data, a foreground image data and a surrounding environment. The identification module is configured to select the one or more personally identifiable elements of the captured multimedia content in real-time or near real-time.

According to an embodiment herein, the modification module is coupled to the identification module to modify the captured multimedia content. The modification module is configured to modify the selected one or more personally identifiable elements in the captured multimedia content. The modification module is configured to modify the selected one or more personally identifiable elements in the captured multimedia content through an image disfiguring or masking process. The modification module is configured to modify the selected one or more personally identifiable elements of the captured multimedia content in real-time or near real-time.

According to an embodiment herein, the first messaging application program interface (API) module is coupled to the modification module. The first messaging API module is provided in the first computing device. The first messaging API module is configured to acquire the modified multimedia content from the modification module and transmit the modified multimedia content to a second computing device. The first messaging API module is configured to provide a cross-platform compatibility.

According to an embodiment herein, the second messaging application program interface (API) module is configured to receive the modified multimedia content from the first computing device. The second messaging API module is provided in the second computing device.

According to an embodiment herein, the display module is configured to exhibit the modified multimedia content. The display module is coupled to the second messaging application program interface (API) module. The display module is present in the second computing device. The display module is configured to receive the modified multimedia content from the second messaging application program interface (API) module for displaying the modified multimedia content in the second computing device.

According to an embodiment herein, the modification module is provided internally with the first computing device or on an external server or in a second computing device at a receiver end to modify the captured multimedia content.

According to an embodiment herein, the modification module is configured to modify the selected one or more personally identifiable elements in the captured multimedia through the image disfiguring or masking process selected from a group consisting of masking, blurring, pixilating, modulating, deleting, hiding, applying one or more layers and filters, superimposing an image or character, audio processing, selective revealing, voice modulation processes, and altering the multimedia content visually.

According to an embodiment herein, the modification module is configured to vary an intensity of masking by varying an intensity of blurring, varying a pixel size during pixelating in the captured multimedia content.

According to an embodiment herein, the modification module is configured to alter an audio feed to prevent a recognition of a voice of a speaker. The modification module is configured to alter the audio feed by modifying a frequency, a speed and a modulation of the audio feed. The modification module is configured to modify both the audio feed and a video feed at an instance successively or simultaneously.

According to an embodiment herein, the identification module is configured to select the one or more personally identifiable elements in the captured multimedia content for modification manually or automatically or semi-automatically. The identification module is configured to select the one or more personally identifiable elements in the captured multimedia content manually by outlining a preset area/areas in the video feed or still picture image by using one or more fingers to specify area/areas to be masked or blurred. The identification module is configured to select the one or more personally identifiable elements in the captured multimedia content manually by outlining a preset area/areas in the video feed or still picture image by using one or more fingers to specify area/areas to be unmasked or unblurred.

According to an embodiment herein, the identification module is configured to select the one or more personally identifiable elements in the captured multimedia content for modification automatically by using an application program interface. The application program interface is selected from a group consisting of a CI detector class, open CV, and Face Detector class.

According to an embodiment herein, the system further comprises a hardware processor for controlling the modification module based on user inputs to modify the selected one or more personally identifiable elements in the captured multimedia content.

According to an embodiment herein, the system further comprises a memory for storing the modified multimedia content for sharing with another user at a later time.

According to an embodiment herein, the first messaging application program interface (API) module is configured to transmit the modified multimedia content received from the modification module or the modified multimedia which is stored already in the memory.

According to an embodiment herein, the modified multimedia content is transmitted from the first computing device to the second computing device through a communication network.

According to an embodiment herein, the first computing device and the second computing device are selected from a group consisting of a mobile phone, a smartphone, a laptop, a general purpose computer, a personal assistant device (PDA), a wearable device, a communication device and a gaming device.

According to an embodiment herein, the modified multimedia content is stored either in the first computing device or in the second computing device or both in the first computing device or in the second computing device.

According to an embodiment herein, a computer-implemented method comprising instructions stored on a non-transitory computer-readable storage medium and executed on a computing device provided with a hardware processor and a memory for modifying and transmitting a multimedia content between two computing devices or communication devices through a messenger application is provided. The method comprising the steps of capturing a multimedia content from a first computing device through a multimedia capture module. The multimedia content includes an image, a picture, a video, metadata, Global Positioning System (GPS) coordinates and an audio. One or more personally identifiable elements in the captured multimedia content are identified and selected by an identification module for modification. The one or more personally identifiable elements are selected from a group consisting of a face of a user, body parts of a user, a location data, an audio data, a video data, a background image data, a foreground image data and a surrounding environment. The one or more personally identifiable elements of the captured multimedia content are selected in real-time or near real-time. The one or more personally identifiable elements in the captured multimedia content are selected for modification manually or automatically or semi-automatically. The one or more personally identifiable elements are identified automatically through an identification technique. The identification technique is selected from a group consisting of a face recognition techniques, an image recognition technique, a pattern recognition technique, an audio and video recognition technique, and a natural language processing technique.

According to an embodiment herein, the captured multimedia content is modified through a modification module. The captured multimedia content is modified by modifying the selected one or more personally identifiable elements in the captured multimedia content. The selected one or more personally identifiable elements in the captured multimedia content is modified through an image disfiguring or masking process. The image disfiguring or masking process is selected from a group consisting of a masking, blurring, pixilating, modification of a pixel or group of pixels, modulating, deleting, hiding, applying one or more layers and filters, superimposing an image or character, audio processing, selective revealing, voice modulation processes, and altering the multimedia content visually. The selected one or more personally identifiable elements of the captured multimedia content are modified in real-time or near real-time.

According to an embodiment herein, the modified multimedia content is communicated to a second computing device through the application program interface (API) module of the messaging application. The API module is configured to provide a cross-platform compatibility.

According to an embodiment herein, the modified multimedia content is displayed on the second computing device through the display module.

According to an embodiment herein, the captured multimedia content is modified internally in the first computing device or on an external server or in a second computing device at a receiver end.

According to an embodiment herein, the modified multimedia content is transmitted from the first computing device to the second computing device through a communication network. The modified multimedia content is stored in the first computing device and the second computing device. The modified multimedia content is stored in a memory for sharing with another user at a later time. The modified multimedia content is transmitted from the first computing device to the second computing device through a communication network.

According to an embodiment herein, the first computing device and the second computing device are selected from a group consisting of a mobile phone, a smartphone, a laptop, a general purpose computer, a personal assistant device (PDA), a wearable device, a communication device and a gaming device.

According to an embodiment herein, the captured multimedia content is modified to vary an intensity of masking by varying an intensity of blurring, varying a pixel size during pixelating in the captured multimedia content.

According to an embodiment herein, the captured multimedia content is modified by altering an audio feed to prevent a recognition of a voice of a speaker. The audio feed is altered by modifying a frequency, a speed and a modulation of the audio feed. The captured multimedia content is modified by altering both the audio feed and n video feed at an instance successively or simultaneously.

According to an embodiment herein, the one or more personally identifiable elements in the captured multimedia content are selected manually by outlining a preset area/ areas in the video feed or still picture image by using one or more fingers to specify area/areas to be masked or blurred. The one or more personally identifiable elements in the captured multimedia content are selected manually by outlining a preset area/areas in the video feed or still picture image by using one or more fingers to specify area/areas to be unmasked or unblurred.

According to an embodiment herein, the one or more personally identifiable elements in the captured multimedia content are selected for modification automatically by using an application program interface. The application program interface is selected from a group consisting of a CI detector class, open CV, and Face Detector class.

According to an embodiment herein, the method further comprises controlling the modification process with a hardware processor based on user inputs for modifying the selected one or more personally identifiable elements in the captured multimedia content.

According to an embodiment herein, the captured multimedia content is modified already using a software application on the first computing device in advance for transmitting at a later time.

The various embodiments herein provide a system for communicating a modified multimedia content using a messaging application. The system comprises a multimedia capture module, a modification module, messaging application program interface (API) module, and a display module.

The multimedia capture module is configured to capture the multimedia content from a first communication device.

The modification module is configured to modify the captured multimedia content. The modification module is configured to modify the captured multimedia content by identifying a plurality of personally identifiable elements in the multimedia content. The plurality of personally identifiable elements in the multimedia content is identified through a plurality of image recognition techniques, face recognition techniques, pattern recognition techniques, and voice recognition techniques. The modification module is coupled to a multimedia capture module. According to an embodiment herein, the modification module is placed internally on the first communication device or on a central server or on a second communication device at a receiving end.

The messaging application program interface (API) module is configured to acquire the modified multimedia content and transmit the modified multimedia content to the second communication device. The messaging API module is configured to provide a cross-platform compatibility and is coupled to the modification module.

The display module is configured to display the modified multimedia content and is coupled to the messaging API module. The display module is provided both in the first communication device and the second communication device.

According to an embodiment herein, the modification module is configured to modify the personally identifiable elements in the captured multimedia contents. The personally identifiable elements in the captured multimedia contents is modified by performing a modification process selected from a group consisting of masking, blurring, pixilating, modification of a pixel or group of pixels, modulating, deleting, hiding, applying one or more layers and filters, superimposing an image or character, audio processing, selective revealing, voice modulation, and altering the multimedia content visually.

According to an embodiment herein, the modification module is configured to identify the personally identifiable elements automatically. According to an embodiment herein, the modification module is configured to identify the personally identifiable elements semi-automatically.

According to an embodiment herein, the modified multimedia content from the first communication device is transmitted to the second communication device through a communication network.

According to an embodiment herein, the modification module is placed externally on a server to modify the captured multimedia content on the server. According to an embodiment herein, the modification module is placed on the second communication device to modify the captured multimedia content on the second communication device placed at the receiver end.

According to an embodiment herein, the first communication device and the second communication device are selected from a group consisting of a mobile phone, a smartphone, a laptop, a general purpose computer, a personal assistant device (PDA), a wearable device, and a gaming device.

According to an embodiment herein, the modification module is configured to identify the personally identifiable elements of the captured multimedia content in real-time or in a near real time.

According to an embodiment herein, the personally identifiable elements are selected from a group consisting of a face of a user, body parts of the user, background image, location data, audio data, metadata, Global Positioning System (GPS) coordinates and video data. According to an embodiment herein, the modified multimedia content is stored in both the first communication device and the second communication device.

According to an embodiment herein, the identification module is configured to specify a boundary area to be masked manually or automatically or semi-automatically.

According to an embodiment herein, the identification module is configured to specify a boundary area to be masked through a touch input. The identification module is configured to specify a boundary area to be masked by touching an image on a touch screen display.

According to an embodiment herein, the identification module is configured to specify area/areas to be masked by outlining or marking or specifying areas to be masked on a displayed image using a finger or fingers.

According to an embodiment herein, the identification module is configured to specify area/areas to be masked by outlining or marking or specifying areas to be unmasked/unblurred on a displayed image using a finger or fingers.

According to an embodiment herein, the identification module is configured to mask specific areas in multimedia contents in a computing device in advance and to transmit the already masked and stored multimedia content to the user during a communication process.

According to an embodiment herein, the system is configured to capture the pictures/multimedia contents through a multimedia content capturing module such as camera, video camera, camcorder, etc., edit pictures through the picture modification module, save the edited pictures on user communication device and transmit the edited pictures using a messaging application.

According to an embodiment herein, the system and method allow the users to maintain privacy and anonymity during an interpersonal communication between two or more individuals by masking the personally identifiable elements such as such as faces, body parts, voice, location data, audio metadata, Global Positioning System (GPS) coordinates and the like in multimedia content.

According to an embodiment herein, the system and method allow the users to maintain privacy and anonymity of a source by masking the personally identifiable elements such as such as faces, body parts, voice, location data, audio and the like in multimedia content.

According to an embodiment herein, the modification module is configured for masking an audio feed to prevent recognition of voice by modifying a frequency, speed, and modulation of the audio feed.

According to an embodiment herein, the modification module is configured for masking a specified area in the captured multimedia contents by specifying the area/areas to be masked in a video feed or still picture by specifying areas with one or more fingers on a picture or video displayed on a screen.

According to an embodiment herein, the modification module is configured for masking a specified area in the captured multimedia contents by specifying the area/areas to be unmasked/unblurred in a video feed or still picture by specifying areas with one or more fingers on a picture or video displayed on a screen.

According to an embodiment herein, the identification module is configured to specify the coordinates of the area to be masked manually using appropriate APIs, such as the CI Detector class in IOS, Open CV on IOS or android, and Face Detector class in Android.

According to an embodiment herein, the system and method are used for interpersonal communication between two or more individuals According to an embodiment herein, the system and method are used for communication of a news media company with sources who choose to remain anonymous.

According to an embodiment herein, the modification module is configured to store the modified multimedia content in a system memory for sharing with another user at a later time.

The various embodiments herein provide a method for communicating a modified multimedia content through a messaging application. The method comprises capturing a multimedia content from a first communication device. A plurality of coordinates for areas for modification is identified through an identification module. The identified coordinates are modified/altered with a modification module. The modified content is transmitted to a second communication device through a communication network. The modified multimedia content is displayed on the second communication device.

According to an embodiment herein, the coordinates are identified automatically through a plurality of techniques. The plurality of techniques includes a face recognition technique, an image recognition technique, a pattern recognition technique, an audio and video recognition technique, and a natural language processing technique.

According to an embodiment herein, the multimedia content is modified or altered done by performing a modification or alteration process selected from a group consisting of masking, blurring, pixilating, modification of a pixel or group of pixels, modulating, deleting, hiding, applying one or more layers and filters, superimposing an image or character, audio processing, selective revealing, voice modulation, and altering the multimedia content visually.

According to an embodiment herein, the modified multimedia content is communicated through the application program interface (API) module of the messaging application. The API module provides a cross-platform compatibility.

According to an embodiment herein, the modified multimedia content is stored both in the first communication and the second communication device.

According to an embodiment herein, the modification of the captured multimedia content is carried out in the first communication device.

According to an embodiment herein, the modification of the captured multimedia content is performed on an external server.

According to an embodiment herein, the modification of the captured multimedia content is done in the second communication device provided at the receiver end.

According to an embodiment herein, the modification of the captured multimedia content is performed in real-time or in near real-time.

According to an embodiment herein, the plurality of the personally identifiable elements is selected from a group consisting of a face of a user, body parts of a user, background image, location data, audio data and video data.

The various embodiments herein provide a method and system for masking and communicating one or more multimedia contents by maintaining privacy and anonymity of the user. The user refers to one or more individuals who can be identified using information in the multimedia content.

For the purpose brevity and definition of the present disclosure, the following terms that are disclosed throughout the specification are defined as follows.

The term "masking" refers to any modification of the multimedia content. The masking is achieved by various methods such as blurring, pixelating, modulating, deleting, hiding, applying one or more layers to an image or frame, superimposing an image or character, audio processing, one or more other alterations on multimedia information.

The term "blurring" refers to a making of a defined area unclear or less distinct. According to an embodiment herein, the blurring of the multimedia refers to alteration or modification of one or more parts of the multimedia unclear using one or more methods provided by the application. The blurring process is applied in a plurality of ways which include but not limited to Gaussian blur and diffused blur techniques.

The term "pixilating" refers to a technique used in editing the multimedia, whereby the multimedia is blurred by displaying partial or entire portion of a multimedia content with a remarkably lower resolution. According to an embodiment herein, the pixilating is primarily used for preventing an identification of one or more elements of multimedia content.

The term "applying layers" refers to an application of one or more styles to the multimedia content. According to an embodiment herein, the one or more types of layers include opaque, transparent or translucent masks, shadows, embossing, satin, color gradient, and the like.

The term "applying filters" refers to an application of one or more visual effects to the multimedia content. According to an embodiment herein, the one or more filter types include fading, applying or changing the background, combining multiple effects, editing the color level, and the like.

The term "voice modulation" or "audio processing" refers to a process of altering the pitch, tone, and style or manner of speaking. According to an embodiment herein, the voice modulation includes but is not limited to modifying the depth of the audio, modifying the pitch, modifying the delay, modifying the modulation rate, and the like.

The term "selective revealing" refers to a selective display of the one or more contents of the multimedia. According to an embodiment herein, the selective revealing of the multimedia is achieved using the one or more tools provided in the application, or by applying one or more combinations of the effects mentioned above.

The term "semi-automatic" refers to a process in which automatic and manual operations are combined to achieve a required masking result. The manual intervention is required for receiving the user's choice/input regarding the type of masking applied or due to the limitations in algorithms for an automatic identification of personally identifiable elements that requires user intervention to identify personally identifiable elements.

According to an embodiment herein, the multimedia content is captured from a computing device with a messenger application. The messenger applications include, but are not limited to mobile applications, desktop applications, browser applications, browser extensions, and the like. The examples of the multimedia content include but are not limited to image, video, animation, text, audio, 3D content, virtual reality content and a combination thereof.

According to an embodiment herein, the messenger application is a cross-platform compatible application and supports a plurality of the versions. The messenger application is applicable for a plurality of the environments.

According to an embodiment herein, the one or more coordinates of the one or more personally identifiable elements of the captured multimedia are identified and masked. According to an embodiment herein, the one or more coordinates of the multimedia content to be masked are defined manually by the user.

According to another embodiment herein, the one or more coordinates of the personally identifiable elements in the multimedia content are recognized either automatically or semi-automatically by one or more methods present in the messenger application.

According to an embodiment herein, the one or more methods present in the messenger application to identify the one or more coordinates of the personally identifiable elements include, but are not limited to image processing applications, face recognition applications, Natural Language Processing (NLP) applications, pattern recognition and the like.

According to an embodiment herein, the personally identifiable elements of the multimedia content include but are not limited to such as faces, body parts, voice, location data, audio and the like.

According to an embodiment herein, a user sends a picture to another user. The application automatically or semi-automatically identifies and masks the personally identifiable elements in the picture prior to transmission.

According to an embodiment herein, the user manually identifies a portion of the video frame that is masked and transmitted from user computing/communication device during a video conference session between multiple users in such a manner that the identified portion is masked throughout the duration of the video conference until the user chooses to switch it off.

According to an embodiment herein, the application automatically or semi-automatically identifies and masks personally identifiable elements in multimedia shared during a video conference session between two or more users in such a manner the identified portion is masked throughout the duration of the video conference until the user chooses to switch it off.

According to an embodiment herein, the identification and masking of the one or more coordinates for masking of the multimedia contents are done in real time or in near real-time.

According to an embodiment herein, the identification and masking of the one or more coordinates of the personally identifiable elements in the multimedia are not done in real-time.

According to an embodiment herein, the masking of the identified personally identifiable elements is achieved through a plurality of methods that include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, the identification and masking of the personally identifiable elements in the multimedia content are processed in the sender's communication device.

According to an embodiment herein, the identification and masking of the personally identifiable elements in the multimedia content are processed by an external server.

According to an embodiment herein, the identification and masking of the personally identifiable elements of the multimedia content are processed in the receiver's device.

According to an embodiment herein, the identification and masking of the personally identifiable elements of the multimedia content are processed at the distinct devices in the system.

According to an embodiment herein, the masked content of the multimedia is not stored on sender or receiver's communication device.

According to an embodiment herein, the masked content of the multimedia is stored on either of the sender or receiver's communication device and the communication network.

According to an embodiment herein, the masked multimedia content is displayed on the receiver's communication device.

According to an embodiment herein, the masked content of the multimedia content is displayed using a display module. The examples of the display module include but are not limited to display screens of the communication device, virtual reality headset, 3D headset, virtual communication platform, gaming platform, speakers and the like.

FIG. 1 illustrates a block diagram of a system for communication between two devices using a communication network, according to an embodiment herein. The system includes a first communication device 102. According to an embodiment herein, the first communication device 102 is capable of transmitting and receiving multimedia content. The first communication device 102 include but are not limited to smartphones, camera, laptop, computer, mobile phone, tablet, Personal Device Assistants (PDAs), gaming device, wearable device, and the like.

According to an embodiment herein, the multimedia content includes but are not limited to image, video, animation, text, audio, 3D content, metadata, Global Positioning System (GPS) coordinates virtual reality content or a combination thereof.

According to an embodiment herein, the first communication device 102 captures one or more multimedia content. The multimedia content is captured through one or more hardware and software applications available on the first communication device 102. Examples of the hardware applications include an integrated camera, microphone, webcam, virtual reality headset, wearable device, and the like. Each of the above-mentioned hardware is supported by a software application that enables the hardware to capture the multimedia content.

According to an embodiment herein, the messenger application 103 is downloaded from an application store, an application market, a network, a storage media and the like. Examples of the application store include but are not limited to PlayStore™, AppStore™, Ovistore™, WindowsStore™ and the like.

According to an embodiment herein, the messenger application 103 masks the personally identifiable elements in the captured or stored multimedia and transmits to the other one or more devices through a communication network.

According to an embodiment herein, the communication network 104 enables transmission and reception of the content from one user to another user. Examples of the communication network include but are not limited to wired network, wireless network, computer network, Local Area Network (LAN), Wireless Area Network (WAN), Metropolitan Area Network (WAN), internet, world wide web, Wi-Fi, Metropolitan Area network (MAN), optical fibre network, telecommunication network, telephone network and the like.

According to an embodiment herein, the communication network 104 has one or more topologies. The network topologies include, but are not limited to bus, mesh, tree, star, hybrid, daisy chain, or a combination thereof.

According to an embodiment herein, the second communication device 106 has the capability to transmit, receive and display multimedia content from one or more communication devices. The second communication device 106 include but are not limited to smartphones, camera, laptop, computer, mobile phone, tablet, Personal Device Assistants (PDAs), and the like.

According to an embodiment herein, the first communication device 102 and the second communication device 106 communicate with each other using the communication network 104.

According to an embodiment herein, the second communication device 106 is loaded with a messenger application 107. According to an embodiment herein, the messenger application 107 is downloaded from an application store, application market, a network, storage media or other such means. Examples of the application store include but are not limited to PlayStore™, AppStore™, Ovistore™, Windows Store™ and the like.

According to an embodiment herein, user A with the first communication device 102 communicates with another user B having the second communication device 106 through the messenger application 103 and the messenger application 107.

According to an embodiment herein, the messenger application 107 receives the masked multimedia content through the communication network 104.

According to an embodiment herein, the messenger application 103, and the messenger application 107 are the same or are compatible with each other.

According to an embodiment herein, the messenger application 103, and the messenger application 107 are compatible with a plurality of operating systems, and a plurality of versions of the operating systems. The plurality of the operating systems includes but are not limited to Android, iOS, Windows, Blackberry, and the like.

According to an embodiment herein, the messenger application 103 and the messenger application 107 are modified appropriately to make them compatible with different operating systems.

According to an embodiment herein, either or both user A (sender) and user B (receiver) wants to maintain privacy by hiding the personally identifiable elements such as such as faces, body parts, voice, location data, audio and the like in multimedia that is shared between the user A and user B.

According to an embodiment herein, the mobile application detects these personally identifiable elements automatically and masks them. Alternatively, the users manually define the coordinates of the multimedia content that is then subsequently masked. Subsequent to the masking the multimedia content is shared among the users.

According to an embodiment herein, the user A transmits the masked multimedia, captured or stored from the first communication device 102.

According to an embodiment herein, the masking of the multimedia content is done using the messenger application 103.

According to an embodiment herein, the messenger application 103 identifies and masks the personally identifiable elements in the multimedia in real-time or in near real-time and transmits it.

According to an embodiment herein, the messenger application 103 identifies and masks the personally identifiable elements in the multimedia content in non-real-time and transmits it.

According to an embodiment herein, the methods for masking of the personally identifiable elements in the multimedia include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, the second communication device 106 includes a display module. Examples of the display module include but are not limited to display screens of the communication device, virtual reality headset, 3D headset, virtual communication platform, gaming platform, speakers and the like. The multimedia content received by the second communication device 106 is displayed on the display module.

Figure 2:
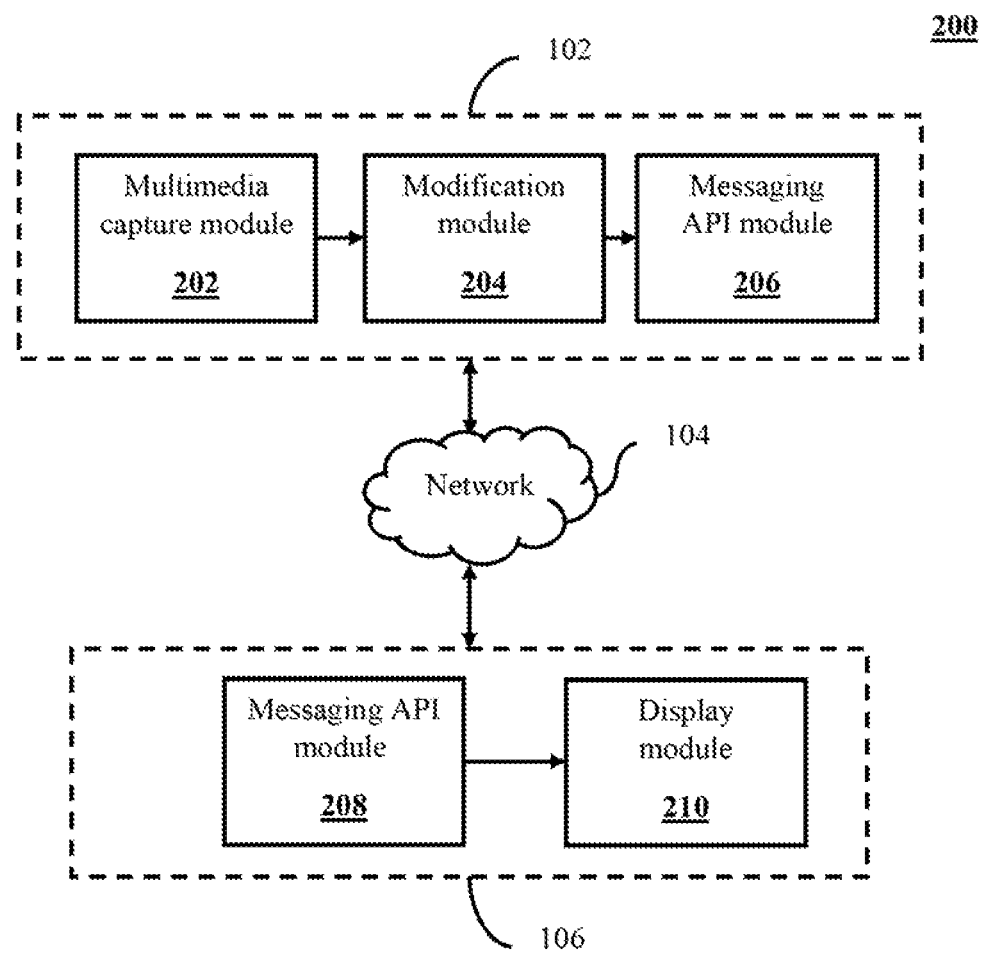
FIG. 2 illustrates a block diagram of a system for masking the personally identifiable elements of the multimedia content in the first communication device, according to an embodiment herein.

FIG. 2 illustrates a block diagram of a system for masking the personally identifiable elements in the multimedia in the communication device, according to an embodiment herein. With respect to the FIG. 2, the first communication device 102 is installed with the messenger application that has the capability to capture multimedia, and identify and mask the personally identifiable elements in the multimedia content and transmit the multimedia along with text messages. According to an embodiment herein, the system includes modules or components responsible for transmitting and receiving the masked multimedia content through the mobile application.

According to an embodiment herein, the system includes the first communication device 102. The first communication device 102 includes a multimedia capture module 202. According to an embodiment herein, the multimedia capture module 202 captures the multimedia contents from the first communication device 102. According to an embodiment herein, the multimedia content includes text, image, video, animation, text, audio, 3D content, virtual reality content or a combination thereof.

According to an embodiment herein, the first communication device 102 includes a modification module 204. The modification module 204 identifies and masks the personally identifiable elements of the multimedia content.

According to an embodiment herein, the user A (sender) of the first communication device 102 manually defines the one or more coordinates of personally identifiable elements in the multimedia content for masking. According to another embodiment herein, the modification module 204 includes a plurality of algorithms such as face recognition algorithms, image recognition algorithms and the like, to automatically or semi-automatically identify the personally identifiable elements in the multimedia content. According to an embodiment herein, the identified elements are masked.

According to an embodiment herein, the methods for masking of the personally identifiable elements in the multimedia include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, identification of the one or more coordinates for masking is done in real-time or near real-time. According to another embodiment herein, identification of the one or more coordinates for masking is done in non-real-time.

According to an embodiment herein, the masking of the one or more identified coordinates in multimedia is done in real-time or near real-time. According to another embodiment herein, the masking of the one or more identified coordinates in multimedia is done in non-real-time.

According to an embodiment herein, the first communication device 102 includes a messaging module 206. According to an embodiment herein, the messaging module 206 uses a plurality of messaging mechanisms or techniques. The plurality of messaging mechanisms or techniques includes SMS, internet, Wi-Fi, email, and the like to transmit information across a network. According to an embodiment herein, the messaging API module 206 acquires the masked multimedia content and transmits the masked multimedia content to the communication devices at another end. Further, the messaging API module 206 provides cross-platform compatibility for communication between the one or more communication devices or platforms.

According to an embodiment herein, the masked multimedia content is transmitted to the other communication devices through the communication network 104.

According to an embodiment herein, the system includes the second communication device 106 for receiving the masked multimedia content from the first communication device 102. According to an embodiment herein, the second communication device 106 is installed with the messenger application 107 that is capable of receiving the masked multimedia content transmitted by the first communication device 102.

According to an embodiment herein, the second communication device 106 installed with the mobile application includes a messaging API module 208. According to an embodiment herein, the functions of the messaging API module 206 and the messaging API module 208 are same.

According to an embodiment herein, the functions of the messaging API module 206 and the messaging API module 208 are different but are compatible with each other.

According to an embodiment herein, the second communication device 106 includes a display module 210. According to an embodiment herein, the display module 210 refers to a system that displays the received multimedia content. Examples of the display module 210 include but are not limited to display screens of the communication device, virtual reality headset, 3D headset, virtual communication platform, gaming platform, speakers and the like. Multimedia content received by messaging module 208 is displayed on the display module 210.

Figure 3:
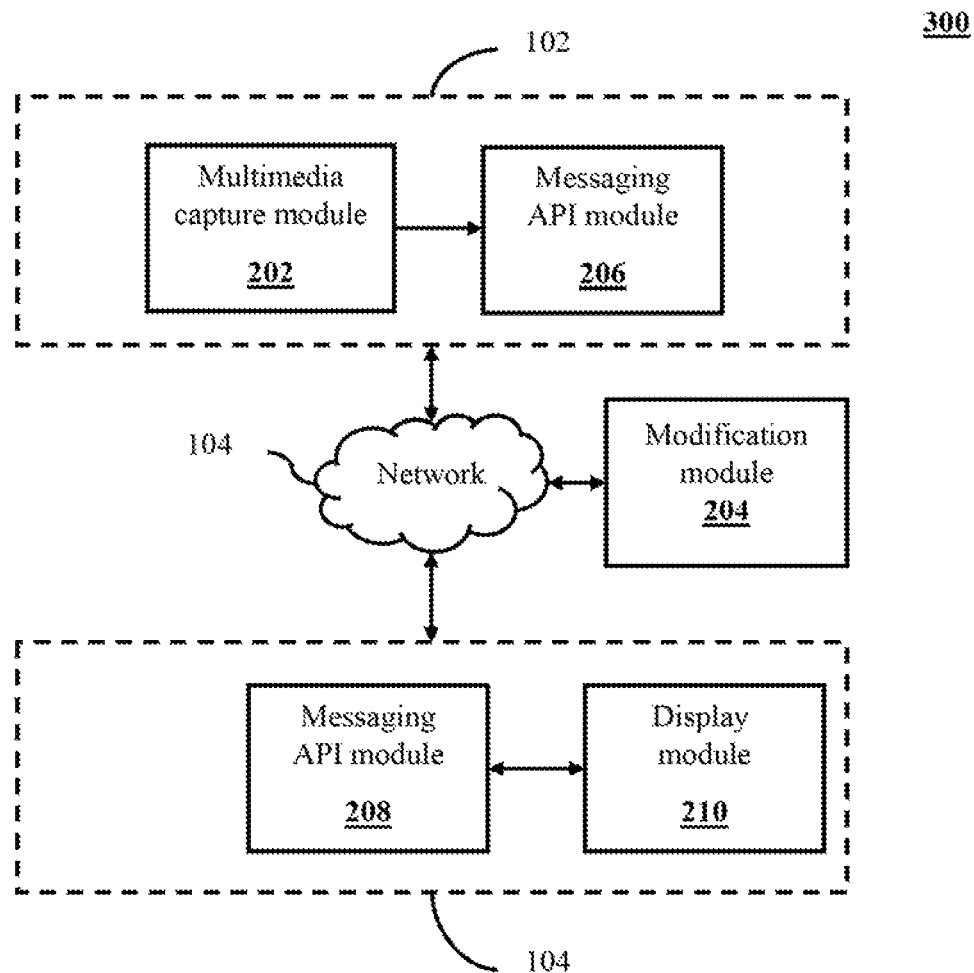
FIG. 3 illustrates a block diagram of a system for masking the personally identifiable elements of the multimedia content using an external server, according to an embodiment herein.

FIG. 3 illustrates a block diagram of a system for masking the personally identifiable elements in the multimedia content using an intermediate server, according to an embodiment herein. With respect to FIG. 3, the first communication device 102 is installed with the messenger application that has the capability to capture multimedia and transmit the multimedia along with text messages. According to an embodiment herein, the system includes modules or components responsible for transmitting and receiving the masked multimedia content through the mobile application.

With respect to FIG. 3, the system includes the first communication device 102. The first communication device 102 includes a multimedia capture module 202 for capturing the one or more multimedia content. According to an embodiment herein, the multimedia capture module 202 captures the multimedia content using the installed messenger application. According to an embodiment herein, the multimedia content includes text, image, video, animation, text, audio, metadata, Global Positioning System (GPS) coordinates 3D content, virtual reality content or a combination thereof.

According to an embodiment herein, the user A of the first communication device 102 manually defines the one or more coordinates of personally identifiable elements in the multimedia content for masking.

According to an embodiment herein, the first communication device 102 includes a messaging module 206. According to an embodiment herein, the messaging module 206 uses a plurality of messaging mechanisms or techniques. The plurality of messaging mechanisms or techniques, includes SMS, internet, Wi-Fi, email, and the like, to transmit information across a network. According to an embodiment herein, the messaging API module 206 acquires the multimedia content and together with the coordinates of the multimedia content identified by user A, transmits it to the communication devices at another end. Further, the messaging API module 206 provides cross-platform compatibility for communication between the one or more communication devices or platforms.

According to an embodiment herein, the masked multimedia content is transmitted to the other communication devices through the communication network 104.

According to an embodiment herein, the system includes the modification module 204. According to an embodiment herein, the modification module 204 is placed externally to the system. According to an embodiment herein, the modification module 204 is placed on an external server (not shown in the figure). According to an embodiment herein, the external server retrieves the multimedia content transmitted by the first communication device 102 using the messenger application and masks the personally identifiable elements that have been identified by user A.

According to an embodiment herein, the modification module 204 includes a plurality of algorithms such as face recognition algorithms, image recognition algorithms and the like, to automatically or semi-automatically identify the personally identifiable elements in the multimedia content. According to an embodiment herein, the identified elements are masked.

According to an embodiment herein, the methods for masking of the personally identifiable elements in the multimedia include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, identification of the one or more coordinates for masking is done in real-time or near real-time. According to another embodiment herein, identification of the one or more coordinates for masking is done in non-real-time.

According to an embodiment herein, the masking of the one or more identified coordinates in multimedia is done in real-time or near real-time. According to another embodiment herein, the masking of the one or more identified coordinates in multimedia is done in non-real-time.

According to an embodiment herein, the system includes the second communication device 106 for receiving the masked multimedia content from the first communication device 102. According to an embodiment herein, the second communication device 106 is installed with the messenger application 107 that is capable of receiving the masked multimedia content transmitted by the first communication device 102.

According to an embodiment herein, the second communication device 106 installed with the mobile application includes a messaging API module 208. According to an embodiment herein, the functions of the messaging API module 206 and the messaging API module 208 are same.

According to an embodiment herein, the functions of the messaging API module 206 and the messaging API module 208 are different but are compatible.

According to an embodiment herein, the second communication device 106 includes a display module 210. According to an embodiment herein, the display module 210 refers to a system that displays the received multimedia content. Examples of the display module 210 include but are not limited to display screens of the communication device, virtual reality headset, 3D headset, virtual communication platform, gaming platform, speakers, and the like. The multimedia content received by messaging module 208 is displayed on the display module 210.

Figure 4:
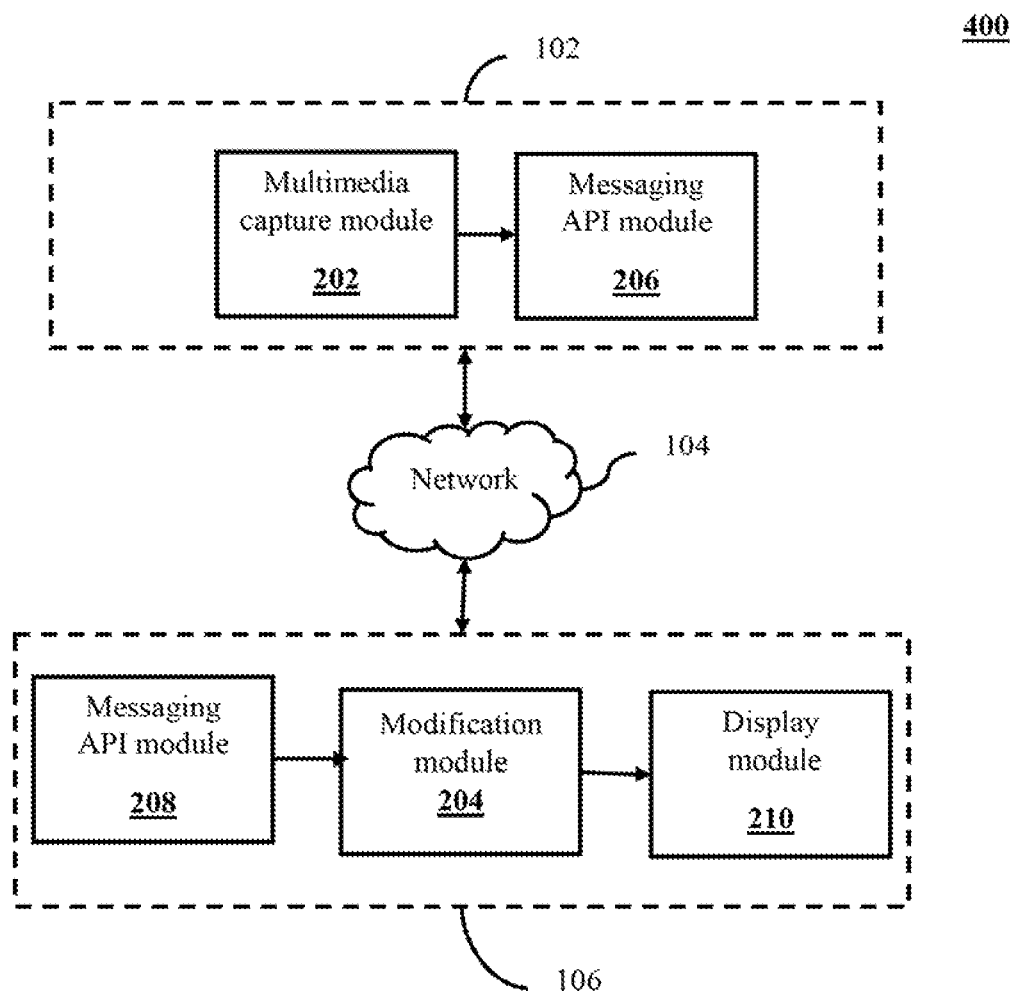
FIG. 4 illustrates a block diagram of a system for masking the personally identifiable elements of the multimedia content in the second communication device at the receiver end, according to an embodiment herein.

FIG. 4 illustrates a block diagram of a system for masking the personally identifiable elements in the multimedia content in the second communication device, according to an embodiment herein. With respect to the FIG. 4, the first communication device 102 is installed with the messenger application that has the capability to capture multimedia and transmit the multimedia along with text messages. According to an embodiment herein, the system includes modules or components responsible for transmitting and receiving the masked multimedia content through the mobile application.

According to an embodiment herein, the system includes the first communication device 102. The first communication device 102 includes a multimedia capture module 202. According to an embodiment herein, the multimedia capture module 202 captures the multimedia content from the first communication device 102 using the installed messenger application 103. According to an embodiment herein, the multimedia content includes text, image, video, animation, text, audio, metadata, Global Positioning System (GPS) coordinates 3D content, virtual reality content or a combination thereof.

According to an embodiment herein, the user A of the first communication device 102 manually defines the one or more coordinates of personally identifiable elements in the multimedia content for masking.

According to an embodiment herein, the first communication device 102 includes a messaging module 206. According to an embodiment herein, the messaging module 206 uses a plurality of messaging mechanisms or techniques. The plurality of messaging mechanisms or techniques includes but not limited to SMS, internet, Wi-Fi, email, and the like, to transmit information across a network. According to an embodiment herein, the messaging API module 206 acquires the multimedia content and together with the coordinates of the multimedia content identified by user A, transmits it to the communication devices at another end. Further, the messaging API module 206 provides cross-platform compatibility for communication between the one or more communication devices or platforms.

According to an embodiment herein, the masked multimedia content is transmitted to the other communication devices through the communication network 104.

According to an embodiment herein, the system includes the second communication device 106, for receiving the multimedia content from the first communication device 102. According to an embodiment herein, the second communication device 106 is installed with the messenger application 107 that is capable of receiving the multimedia content transmitted by the first communication device 102.

According to an embodiment herein, the second communication device 106 installed with the mobile application includes a messaging API module 208. According to an embodiment herein, the functions of the messaging API module 206 and the messaging API module 208 are same.

According to an embodiment herein, the functions of the messaging API module 206 and the messaging API module 208 are different but are compatible with each other.

According to an embodiment herein the second communication device 106 includes the modification module 204.

According to an embodiment herein, the modification module 204 retrieves the multimedia content received by messaging API module 208 and masks the personally identifiable elements that have been identified by user A.

According to an embodiment herein, the modification module 204 includes a plurality of algorithms such as face recognition algorithms, image recognition algorithms and the like, to automatically or semi-automatically identify the personally identifiable elements in the multimedia content. According to an embodiment herein, the identified elements are masked.

According to an embodiment herein, the methods for masking of the personally identifiable elements in the multimedia include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, identification of the one or more coordinates for masking is done in real-time or near real-time. According to another embodiment herein, identification of the one or more coordinates for masking is done in non-real-time.

According to an embodiment herein, the masking of the one or more identified coordinates in multimedia is done in real-time or near real-time. According to another embodiment herein, the masking of the one or more identified coordinates in multimedia is done in non-real-time.

According to an embodiment herein, the second communication device 106 includes a display module 210. According to an embodiment herein, the display module 210 refers to a system that displays the received multimedia content. Examples of the display module 210 include but are not limited to display screens of the communication device, virtual reality headset, 3D headset, virtual communication platform, gaming platform, speakers, and the like. The multimedia content received from the modification module 204 is displayed on the display module 210.

Figure 5:
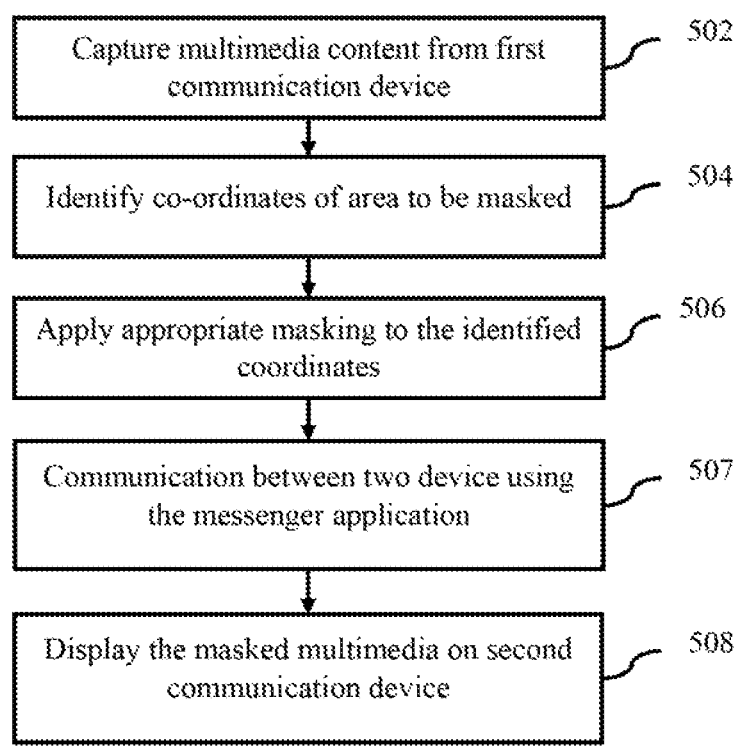
FIG. 5 illustrates a flowchart explaining a method for modifying the personally identifiable elements of the multimedia content in a messenger application, according to an embodiment herein.

FIG. 5 illustrates a flowchart explaining a method for masking the personally identifiable contents of the multimedia content in a messaging application, according to an embodiment herein. According to an embodiment herein, the multimedia content is captured from a communication device using the messenger application (Step 502). The examples of the multimedia content include but are not limited to text, image, video, animation, text, audio, metadata, Global Positioning System (GPS) coordinates 3D content, virtual reality content or a combination thereof.

The coordinates of the personally identifiable elements in the captured multimedia are identified for masking (Step 504). According to an embodiment herein, the coordinates for masking the personally identifiable elements of the captured multimedia are defined by the user. According to another embodiment herein, the messaging application includes a plurality of algorithms such as face recognition algorithms, image recognition algorithms and the like, to automatically or semi-automatically identify the personally identifiable elements in the multimedia content. According to an embodiment herein, the identified elements are masked.

According to an embodiment herein, the methods for masking of the personally identifiable elements in the multimedia include but are not limited to blurring, pixelating, modification of a pixel or group of pixels, modulating, deleting, hiding, applying one or more layers to an image or frame, superimposing an image or character, audio processing, one or more other alterations on multimedia and the like.

According to an embodiment herein, the one or more personally identifiable elements in the captured multimedia content are selected for modification manually or automatically or semi-automatically. The one or more personally identifiable elements are identified automatically through an identification technique. The identification technique is selected from a group consisting of a face recognition techniques, an image recognition technique, a pattern recognition technique, an audio and video recognition technique, and a natural language processing technique.

According to an embodiment herein, identification of the one or more coordinates for masking is done in real-time or in near real-time. According to another embodiment herein, identification of the one or more coordinates for masking is done in non-real-time.

According to an embodiment herein, the masking of the one or more identified coordinates in multimedia is done in real-time or near real-time.

According to another embodiment herein, the masking of the one or more identified coordinates in multimedia is done in non-real-time.

According to an embodiment herein, the identification and masking or a combination thereof of the personally identifiable elements of the multimedia content are processed in the sender's communication device.

According to an embodiment herein, the identification and masking or a combination thereof, of the personally identifiable elements of the multimedia content is processed by an external server.

According to an embodiment herein, the identification and masking or a combination thereof, of the personally identifiable elements of the multimedia content is processed in the receiver's device.

According to an embodiment of the herein, the identification and masking of the personally identifiable elements of the multimedia content may be processed in distinct devices.

Furthermore, the masked multimedia content is displayed on the receiver's communication device (Step 508). According to an embodiment herein, the receiver's communication device has systems that display the received multimedia content. Examples of the systems include but are not limited to display screens of the communication device, virtual reality headset, 3D headset, virtual communication platform, gaming platform, speakers and the like.

The method comprising the steps of capturing a multimedia content from a first computing device through a multimedia capture module. The multimedia content includes an image, a picture, a video, and an audio. One or more personally identifiable elements in the captured multimedia content are identified and selected by an identification module for modification. The one or more personally identifiable elements are selected from a group consisting of a face of a user, body parts of a user, a location data, an audio data, a video data, a background image data, a foreground image data and a surrounding environment. The one or more personally identifiable elements of the captured multimedia content are selected in real-time or near real-time. The one or more personally identifiable elements in the captured multimedia content are selected for modification manually or automatically or semi-automatically. The one or more personally identifiable elements are identified automatically through an identification technique. The identification technique is selected from a group consisting of a face recognition techniques, an image recognition technique, a pattern recognition technique, an audio and video recognition technique, and a natural language processing technique.

According to an embodiment herein, the captured multimedia content is modified through a modification module. The captured multimedia content is modified by modifying the selected one or more personally identifiable elements in the captured multimedia content. The selected one or more personally identifiable elements in the captured multimedia content is modified through an image disfiguring or masking process. The image disfiguring or masking process is selected from a group consisting of a masking, blurring, pixilating, modification of a pixel or group of pixels, modulating, deleting, hiding, applying one or more layers and filters, superimposing an image or character, audio processing, selective revealing, voice modulation processes, and altering the multimedia content visually. The selected one or more personally identifiable elements of the captured multimedia content are modified in real-time or near real-time.

According to an embodiment herein, the modified multimedia content is communicated to a second computing device through the application program interface (API) module of the messaging application. The API module is configured to provide a cross-platform compatibility.

According to an embodiment herein, the modified multimedia content is displayed on the second computing device through the display module.

According to an embodiment herein, the captured multimedia content is modified internally in the first computing device or on an external server or in a second computing device at a receiver end.

According to an embodiment herein, the modified multimedia content is transmitted from the first computing device to the second computing device through a communication network. The modified multimedia content is stored in the first computing device and the second computing device. The modified multimedia content is stored in a memory for sharing with another user at a later time. The modified multimedia content is transmitted from the first computing device to the second computing device through a communication network.

According to an embodiment herein, the first computing device and the second computing device are selected from a group consisting of a mobile phone, a smartphone, a laptop, a general purpose computer, a personal assistant device (PDA), a wearable device, a communication device and a gaming device.

According to an embodiment herein, the captured multimedia content is modified to vary an intensity of masking by varying an intensity of blurring, varying a pixel size during pixelating in the captured multimedia content.

According to an embodiment herein, the captured multimedia content is modified by altering an audio feed to prevent a recognition of a voice of a speaker. The audio feed is altered by modifying a frequency, a speed and a modulation of the audio feed. The captured multimedia content is modified by altering both the audio feed and a video feed at an instance successively or simultaneously.

According to an embodiment herein, the one or more personally identifiable elements in the captured multimedia content are selected manually by outlining a preset area/areas in the video feed or still picture image by using one or more fingers to specify area/areas to be masked or blurred. The one or more personally identifiable elements in the captured multimedia content are selected manually by outlining a preset area/areas in the video feed or still picture image by using one or more fingers to specify area/areas to be unmasked or unblurred.

According to an embodiment herein, the one or more personally identifiable elements in the captured multimedia content are selected for modification automatically by using an application program interface. The application program interface is selected from a group consisting of a CI detector class, open CV, and Face Detector class.

According to an embodiment herein, the method further comprises controlling the modification process with a hardware processor based on user inputs for modifying the selected one or more personally identifiable elements in the captured multimedia content.

According to an embodiment herein, the captured multimedia content is modified already using a software application on the first computing device in advance for transmitting at a later time.

Figure 6:
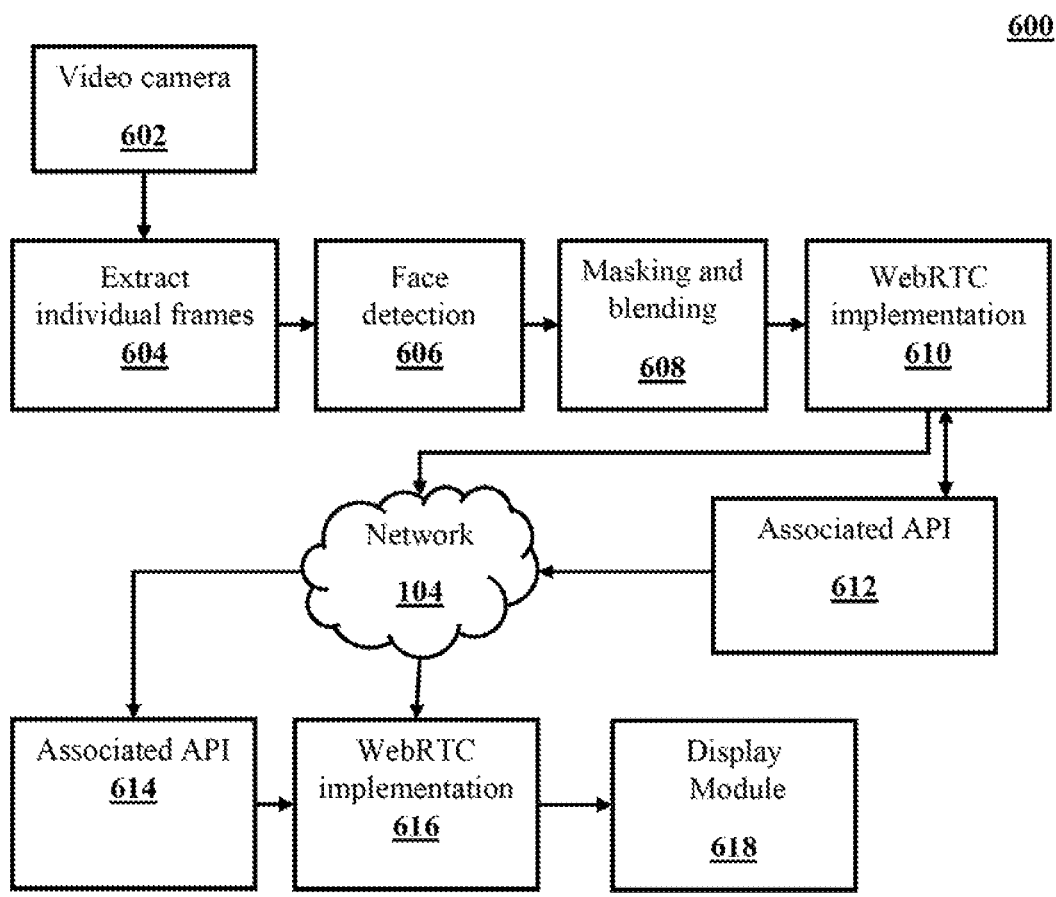
FIG. 6 illustrates a block diagram of a system for modifying and transmitting multimedia contents between two communication devices in a communication network, according to an embodiment herein.

FIG. 6 illustrates a block diagram of a system for implementing the masking of the personally identifiable elements of the multimedia content in a messenger application, according to an embodiment herein. The system includes a video camera 602, an extraction module 604, a face detection module 606, a masking and blending module 608, a WebRTC implementation module-1 610, an associated API module-1 612, a network 104, an associated API module-2 614, a WebRTC implementation module-2 616, and a display module 618.

The video camera 602 captures the video stream using a camera capture application program interface (API) of the mobile device. Once the video stream is captured, the extraction module 604 is used to extract the individual frames from the video stream. According to an embodiment herein, the extraction module 604 is configured to extract the individual frames using a plurality of standard protocols. The face detection module 606 detects the video in the extracted frames. For example, in an iPhone, the CIDetector Class is used for detecting the face of the user for masking and blending the personally identifiable elements.

Further, the masking and blending module 608 is configured to mask and blend the extracted video frames. According to an embodiment herein, a mask is selected and blended with the original frame with the bounds specified by the APIs provided by the face detection module 606. According to an embodiment herein, the boundaries of the area to be masked/altered are adjusted manually by the user of the mobile device. According to an embodiment herein, the boundaries of the masking areas are adjusted automatically.

According to an embodiment herein, the associated Quickblox™ implementation module 610 is responsible for signaling during the WebRTC call. According to an embodiment herein, the webRTC implementation module 610 is configured to combine the blended frame with the audio and is transmitted over the communication network 104 using the WebRTC implementation.

The associated API 614 is responsible for the signaling of WebRTC implementation module 616. The display module 618 is operated to display the masked and blended videos in which the personally identifiable elements are masked.

Figure 7:
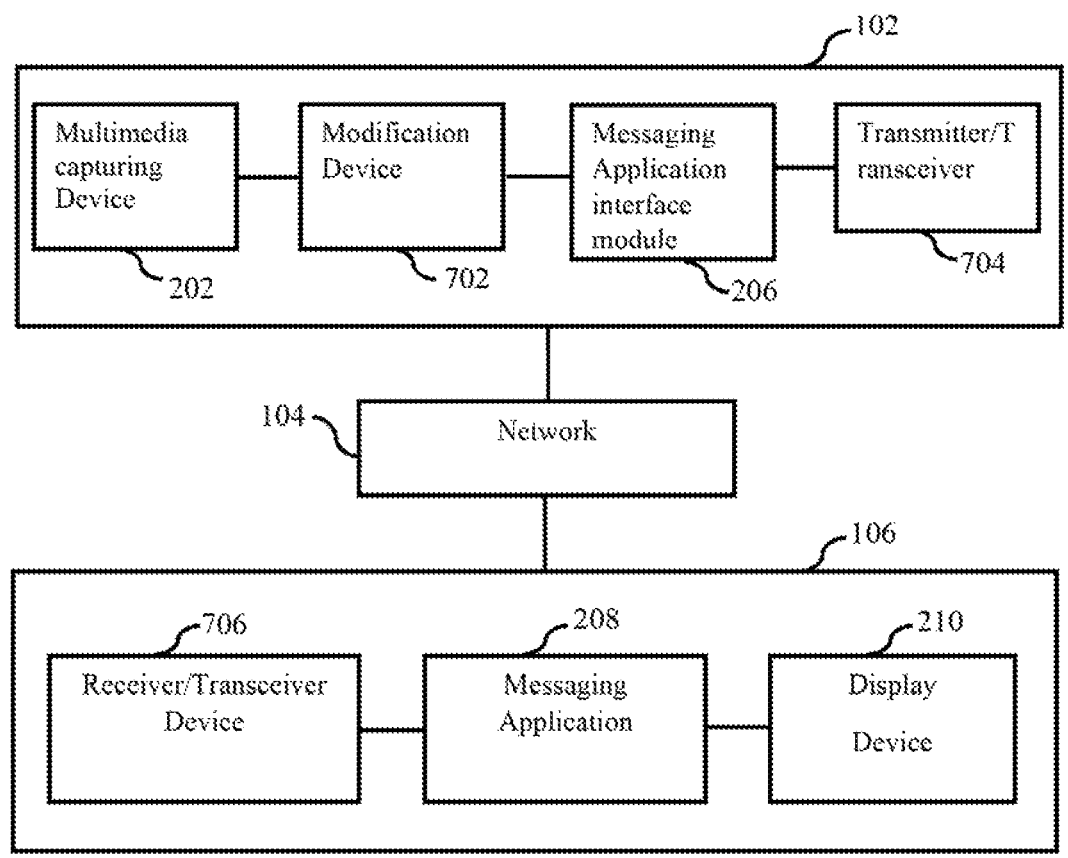
FIG. 7 illustrates a block diagram of a system for modifying and transmitting multimedia contents between two communication devices with modifications carried out at a sender end in a communication network, according to an embodiment herein.

FIG. 7 illustrates a block diagram of a system for modifying and transmitting multimedia contents between two communication devices with modifications carried out at a sender end in a communication network, according to an embodiment herein, with respect to FIG. 7, the system comprises a multimedia capture device 202, a modification device 702 comprising an identification module coupled to the multimedia capture module, a modification module coupled to the identification module, a first messaging application program interface (API) module 206 coupled to the modification module, a transceiver 704 in a first communication device 102, a transceiver 706 in a second communication device 106, a second messaging application program interface (API) module 208, and a display module 210.

According to an embodiment herein, the multimedia capture module 202 is arranged in a first computing device 102 to capture the multimedia content. The multimedia content includes an image, a picture, a video, metadata, Global Positioning System (GPS) coordinates and an audio.

According to an embodiment herein, the identification module is configured to select one or more personally identifiable elements in the captured multimedia content for modification. The one or more personally identifiable elements are selected from a group consisting of a face of a user, body parts of a user, a location data, an audio data, a video data, a background image data, a foreground image data and a surrounding environment. The identification module is configured to select the one or more personally identifiable elements of the captured multimedia content in real-time or near real-time.

According to an embodiment herein, the modification module is coupled to the identification module to modify the captured multimedia content. The modification module is configured to modify the selected one or more personally identifiable elements in the captured multimedia content. The modification module is configured to modify the selected one or more personally identifiable elements in the captured multimedia content through an image disfiguring or masking process. The modification module is configured to modify the selected one or more personally identifiable elements of the captured multimedia content in real-time or near real-time.

According to an embodiment herein, the first messaging application program interface (API) module 206 is coupled to the modification module. The first messaging API module 206 is provided with the first computing device. The first messaging API module 206 is configured to acquire the modified multimedia content from the modification module and transmit the modified multimedia content to a second computing device 106. The first messaging API module 206 is configured to provide a cross-platform compatibility.

According to an embodiment herein, the second messaging application program interface (API) module 208 is configured to receive the modified multimedia content from the first computing device 102. The second messaging API module is provided in the second computing device 106.

According to an embodiment herein, the display module 210 is configured to exhibit the modified multimedia content. The display module 210 is coupled to the second messaging application program interface (API) module 208. The display module 210 is present in the second computing device 106. The display module 210 is configured to receive the modified multimedia content from the second messaging application program interface (API) module 208 for displaying the modified multimedia content in the second computing device 106.

According to an embodiment herein, the modification module is provided internally with the first computing device 102 or in an external server or in a second computing device 106 at a receiver end to modify the captured multimedia content.

According to an embodiment herein, the modification module is configured to modify the selected one or more personally identifiable elements in the captured multimedia through the image disfiguring or masking process selected from a group consisting of masking, blurring, pixilating, modification of a pixel or group of pixels, modulating, deleting, hiding, applying one or more layers and filters, superimposing an image or character, audio processing, selective revealing, voice modulation processes, and altering the multimedia content visually.

According to an embodiment herein, the modification module is configured to vary an intensity of masking by varying an intensity of blurring, varying a pixel size during pixelating in the captured multimedia content.

According to an embodiment herein, the modification module is configured to alter an audio feed to prevent a recognition of a voice of a speaker. The modification module is configured to alter the audio feed by modifying a frequency, a speed and a modulation of the audio feed. The modification module is configured to modify both the audio feed and a video feed at an instance successively or simultaneously.

According to an embodiment herein, the identification module is configured to select the one or more personally identifiable elements in the captured multimedia content for modification manually or automatically or semi-automatically. The identification module is configured to select the one or more personally identifiable elements in the captured multimedia content manually by outlining a preset area/areas in the video feed or still picture image by using one or more fingers to specify area/areas to be masked or blurred. The identification module is configured to select the one or more personally identifiable elements in the captured multimedia content manually by outlining a preset area/areas in the video feed or still picture image by using one or more fingers to specify area/areas to be unmasked or unblurred.

According to an embodiment herein, the identification module is configured to select the one or more personally identifiable elements in the captured multimedia content for modification automatically by using an application program interface. The application program interface is selected from a group consisting of a CI detector class, open CV, and Face Detector class.

According to an embodiment herein, the system further comprises a hardware processor for controlling the modification module based on user inputs to modify the selected one or more personally identifiable elements in the captured multimedia content.

According to an embodiment herein, the system further comprises a memory for storing the modified multimedia content for sharing with another user at a later time.

According to an embodiment herein, the first messaging application program interface (API) module 206 is configured to transmit the modified multimedia content received from the modification module or the modified multimedia which is stored already in the memory.

According to an embodiment herein, the modified multimedia content is transmitted from the first computing device 102 to the second computing device 106 through a communication network 104.

According to an embodiment herein, the first computing device 102 and the second computing device 106 are selected from a group consisting of a mobile phone, a smartphone, a laptop, a general purpose computer, a personal assistant device (PDA), a wearable device, a communication device and a gaming device.

According to an embodiment herein, the modified multimedia content is stored both in the first computing device 102 and the second computing device 106.

Figure 8:
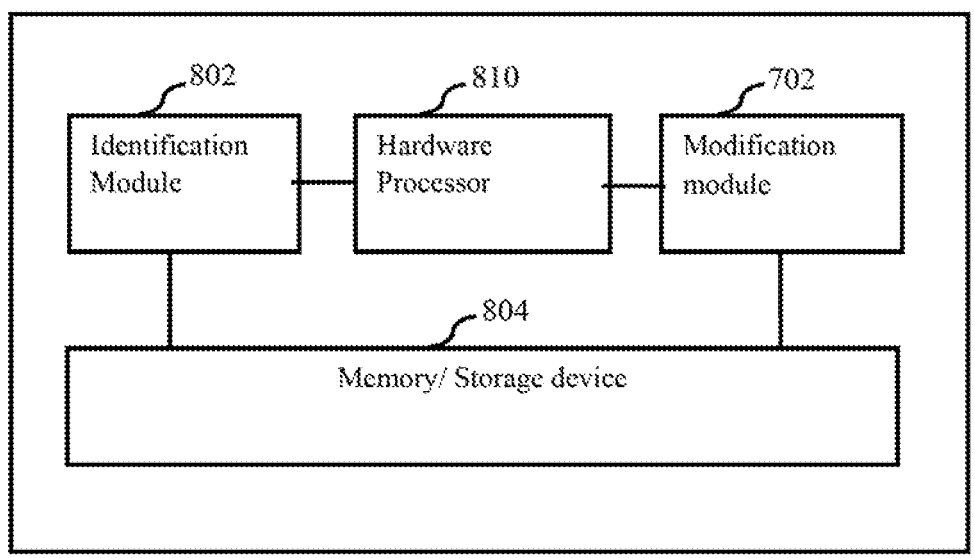
FIG. 8 illustrates a block diagram of a modification device/module for identifying and modifying personally identifiable elements of the multimedia content in a communication network, according to an embodiment herein.

FIG. 8 illustrates a block diagram of a modification device/module for identifying and modifying personally identifiable elements of the multimedia content in a communication network, according to an embodiment herein.

With respect FIG. 8, the picture modification device comprises the identification module 802, the modification module 702 coupled to the identification module 802, the hardware processor 810 coupled to the identification module 802 and the modification module 702, and the memory 804.

According to an embodiment herein, the identification module 802 is configured to select one or more personally identifiable elements in the captured multimedia content for modification. The one or more personally identifiable elements are selected from a group consisting of a face of a user, body parts of a user, a location data, an audio data, a video data, a background image data, a foreground image data and a surrounding environment. The identification module is configured to select the one or more personally identifiable elements of the captured multimedia content in real-time or near real-time.

According to an embodiment herein, the modification module 702 is coupled to the identification module 802 to modify the captured multimedia content. The modification module 702 is configured to modify the selected one or more personally identifiable elements in the captured multimedia content. The modification module 702 is configured to modify the selected one or more personally identifiable elements in the captured multimedia content through an image disfiguring or masking process. The modification module 702 is configured to modify the selected one or more personally identifiable elements of the captured multimedia content in real-time or near real-time.

According to an embodiment herein, the modification module 702 is provided internally with the first computing device or on an external server or in a second computing device at a receiver end to modify the captured multimedia content.

According to an embodiment herein, the modification module 702 is configured to modify the selected one or more personally identifiable elements in the captured multimedia through the image disfiguring or masking process selected from a group consisting of masking, blurring, pixilating, modification of a pixel or group of pixels, modulating, deleting, hiding, applying one or more layers and filters, superimposing an image or character, audio processing, selective revealing, voice modulation processes, and altering the multimedia content visually.

According to an embodiment herein, the modification module 702 is configured to vary an intensity of masking by varying an intensity of blurring, varying a pixel size during pixelating in the captured multimedia content.

According to an embodiment herein, the modification module 702 is configured to alter an audio feed to prevent a recognition of a voice of a speaker. The modification module is configured to alter the audio feed by modifying a frequency, a speed and a modulation of the audio feed. The modification module 702 is configured to modify both the audio feed and a video feed at an instance successively or simultaneously.

According to an embodiment herein, the identification module 802 is configured to select the one or more personally identifiable elements in the captured multimedia content for modification manually or automatically or semi-automatically. The identification module 802 is configured to select the one or more personally identifiable elements in the captured multimedia content manually by outlining a preset area/areas in the video feed or still picture image by using one or more fingers to specify area/areas to be masked or blurred. The identification module 802 is configured to select the one or more personally identifiable elements in the captured multimedia content manually by outlining a preset area/areas in the video feed or still picture image by using one or more fingers to specify area/areas to be unmasked or unblurred.

According to an embodiment herein, the identification module 802 is configured to select the one or more personally identifiable elements in the captured multimedia content for modification automatically by using an application program interface. The application program interface is selected from a group consisting of a CI detector class, open CV, and Face Detector class.

According to an embodiment herein, the system further comprises a hardware processor 810 for controlling the modification module based on user inputs to modify the selected one or more personally identifiable elements in the captured multimedia content.

According to an embodiment herein, the system further comprises a memory 804 for storing the modified multimedia content for sharing with another user at a later time.

The various embodiments herein provide a method and system for electronic communication between two users while maintaining privacy and anonymity by masking personally identifiable elements in multimedia content. The system enables the users to communicate with each other using a plurality of multimedia modes (such as video and voice) while reducing the social consequences and embarrassment when such multimedia are released to an unintended audience. The system allows the users to maintain privacy and anonymity with a minimal effort. The system automatically identifies and masks the personally identifiable elements in multimedia content in real time or near real time. The system allows the user to manually define the coordinates of the multimedia content to be masked. The system allows the user to semi-automatically define the coordinates of the multimedia content to be masked. The system allows the users to customize the degree of privacy and anonymity while communicating with each other. The system allows the identification and masking of the personally identifiable element in multimedia content in run-time to maintain privacy in instant messaging and video conferencing applications. The system allows a plurality of users to have a video conference such that one or more personally identifiable elements such as faces, body parts, voice, location data, audio and the like of one or more users are automatically identified and masked in the video and audio stream. The system allows a plurality of users to share pictures such that one or more personally identifiable elements such as faces, body parts, location data, and the like of one or more users are automatically identified in the picture and are masked. The system prevents the misuse of the multimedia content by a third party or third-party applications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall therebetween.

What is claimed is:

1. A system for modifying a multimedia content and transmitting the modified multimedia content between two computing devices or communication devices through a messenger application, the system comprises:

a first computing device comprising a first hardware processor and a first memory;

a second computing device comprising a second hardware processor and a second memory;

a multimedia capture module run on the first hardware processor and configured to capture the multimedia content, and wherein the multimedia capture module is arranged in the first computing device to capture the multimedia content, and wherein the multimedia content includes an image, a picture, a video, metadata, Global Positioning System (GPS) coordinates and an audio;

an identification module coupled to the multimedia capture module and wherein the identification module is run on the first hardware processor and configured to select one or more personally identifiable elements in the captured multimedia content for modification, and wherein the one or more personally identifiable elements are selected from a group consisting of a face of a user, body parts of a user, a location data, an audio data, a video data, a background image data, a foreground image data and a surrounding environment and wherein the identification module is configured to select the one or more personally identifiable elements of the captured multimedia content in real-time or near real-time;

a modification module coupled to the identification module to modify the captured multimedia content to obtain the modified multimedia content, and wherein the modification module is run on the first hardware processor and configured to modify the selected one or more personally identifiable elements in the captured multimedia content, and wherein the modification module is configured to modify the selected one or more personally identifiable elements in the captured multimedia content through an image disfiguring, pixel manipulation, or masking process, and wherein the modification module is configured to modify the selected one or more personally identifiable elements of the captured multimedia content in real-time or near real-time;

a first messaging application program interface (API) module coupled to the modification module, and wherein the first messaging API module is provided in the first computing device, and wherein the first messaging API module is run on the first hardware processor and configured to acquire the modified multimedia content from the modification module and transmit the modified multimedia content to the second computing device, and wherein the first messaging API module is configured to provide a cross-platform compatibility; and a second messaging application program interface (API) module run on the second hardware processor and configured to receive the modified multimedia content from the first computing device, and wherein the second messaging API module is provided in the second computing device; and a display module run on the second hardware processor and configured to exhibit the modified multimedia content, and wherein the display module is coupled to the second messaging application program interface (API) module, and wherein the display module is present in the second computing device, and wherein the display module is configured to receive the modified multimedia content from the second messaging application program interface (API) module for displaying the modified multimedia content in the second computing device;

wherein the modification module is provided internally with the first computing device or on an external server or in the second computing device at a receiver end to modify the captured multimedia content and wherein the modification module is configured to vary an intensity of masking by varying an intensity of blurring, varying an amount of pixel manipulation, and varying a pixel size during pixelating in the captured multimedia content, and wherein the modification module is configured to alter an audio feed to prevent a recognition of a voice of a speaker, and wherein the modification module is configured to alter the audio feed by modifying a frequency, a speed and a modulation of the audio feed, wherein the modification module is configured to modify both the audio feed and a video feed at an instance successively or simultaneously.

2. The system according to claim 1, wherein the modification module is configured to modify the selected one or more personally identifiable elements in the captured multimedia content through the image disfiguring or masking process selected from a group consisting of masking, blurring, pixilating modulating, pixel manipulation, deleting, hiding, applying one or more layers and filters, superimposing an Image or character, audio processing, selective revealing, voice modulation processes, and altering the multimedia content visually.

3. The system according to claim 1, wherein the identification module is configured to select the one or more personally identifiable elements in the captured multimedia content for modification manually or automatically or semi-automatically.

4. The system according to claim 1, wherein the identification module is configured to select the one or more personally identifiable elements in the captured multimedia content manually by outlining a preset area/areas in the video feed or a still picture image by using one or more fingers to specify area/areas to be masked or blurred, and wherein the identification module is configured to select the one or more personally identifiable elements in the captured multimedia content manually by outlining a preset area/areas in the video feed or the still picture image by using one or more fingers to specify area/areas to be unmasked or unblurred.

5. The system according to claim 1, wherein the identification module is configured to select the one or more personally identifiable elements in the captured multimedia content for modification automatically by using an application program interface, and wherein the application program interface is selected from a group consisting of a CI detector class, open CV and Face Detector class.

6. The system according to claim 1, further comprises the first hardware processor for controlling the modification module based on user inputs to modify the selected one or more personally identifiable elements in the captured multimedia content.

7. The system according to claim 1, further comprises the first memory for storing the modified multimedia content for sharing with another user at a later time.

8. The system according to claim 1, wherein the first messaging application program interface (API) module is configured to transmit the modified multimedia content received from the modification module or the modified multimedia which is stored in the first memory.

9. The system according to claim 1, wherein the modified multimedia content is transmitted from the first computing device to the second computing device through a communication network.

10. The system according to claim 1, wherein the first computing device and the second computing device are selected from a group consisting of a mobile phone, a smartphone, a laptop, a general purpose computer, a personal assistant device (PDA), a wearable device, a communication device and a gaming device.

11. The system according to claim 1, wherein the modified multimedia content is stored either in the first computing device or in the second computing device or both in the first computing device and in the second computing device.

12. A method implemented using computer comprising instructions stored on a non-transitory computer-readable storage medium and executed on a computing device provided with a hardware processor and a memory for modifying and transmitting a multimedia content between two computing devices or communication devices through a messenger application, the method comprising the steps of:

capturing the multimedia content from a first computing device through a multimedia capture module, and wherein the multimedia content includes an image, metadata, Global Positioning System (GPS) coordinates, a picture, a video, and an audio;

identifying and selecting one or more personally identifiable elements in the captured multimedia content with an identification module for modification, and wherein the one or more personally identifiable elements are selected from a group consisting of a face of a user, body parts of a user, a location data, an audio data, a video data, a background image data, a foreground image data and a surrounding environment, and wherein the one or more personally identifiable elements of the captured multimedia content are selected in real-time or near real time, and wherein the one or more personally identifiable elements in the captured multimedia content are selected for modification manually or automatically or semi-automatically, and wherein the one or more personally identifiable elements are identified automatically through an identification technique, and wherein the identification technique is selected from a group consisting of a face recognition technique, an image recognition technique, a pattern recognition technique, an audio and video recognition technique, and a natural language processing technique;

modifying the captured multimedia content through a modification module, and wherein the captured multimedia content is modified by modifying the selected one or more personally identifiable elements in the captured multimedia content, and wherein the selected one or more personally identifiable elements in the captured multimedia content is modified through an image disfiguring or masking process, and wherein the image disfiguring or masking process is selected from a group consisting of a masking, blurring, pixilating, pixel manipulation, modulating, deleting, hiding, applying one or more layers and filters, superimposing an image or character, audio processing, selective revealing, voice modulation processes, and altering the captured multimedia content visually, and wherein the selected one or more personally identifiable elements of the captured multimedia content are modified in real-time or near real-time;

communicating the modified multimedia content to a second computing device through an application program interface (API) module of the messenger application, wherein the API module is configured to provide a cross-platform compatibility; and displaying the modified multimedia content on the second computing device through a display module;

wherein the captured multimedia content is modified internally in the first computing device or on an external server or in the second computing device at a receiver end, and wherein the modified multimedia content is transmitted from the first computing device to the second computing device through a communication network, and wherein the modified multimedia content is stored in the first computing device and the second computing device, wherein the modified multimedia content is stored in a memory for sharing with another user at later time, and wherein the first computing device and the second computing device are selected from a group consisting of a mobile phone, a smartphone, a laptop, a general purpose computer, a personal assistant device (PDA), wearable device, a communication device and a gaming device, and wherein the captured multimedia content is modified to vary an intensity of masking by varying an intensity of blurring, varying a pixel size during pixelating in the captured multimedia content, and wherein the captured multimedia content is modified by altering an audio feed to prevent a recognition of a voice of a speaker, and wherein the audio feed is altered by modifying a frequency, a speed and a modulation of the audio feed, wherein the captured multimedia content is modified by altering both the audio feed and a video feed at an instance successively or simultaneously.

13. The method according to claim 12, wherein the one or more personally identifiable elements in the captured multimedia content are selected manually by outlining a preset area/areas in the video feed or a still picture image by using one or more fingers to specify area/areas to be masked or blurred, and wherein the one or more personally identifiable elements in the captured multimedia content are selected manually by outlining a preset area/areas in the video feed or the still picture image by using one or more fingers to specify area/areas to be unmasked or unblurred.

14. The method according to claim 12, wherein the one or more personally identifiable elements in the captured multimedia content are selected for modification automatically by using an application program interface, and wherein the application program interface is selected from a group consisting of a CI detector class, open CV and Face Detector class.

15. The method according to claim 12, further comprises controlling the modification module with the hardware processor based on user inputs for modifying the selected one or more personally identifiable elements in the captured multimedia content.

16. The method according to claim 12, wherein the captured multimedia content is modified using a software application on the first computing device in advance for transmitting at a later time.

* * * * *